United States Patent
Bremer et al.

(10) Patent No.: US 6,257,834 B1
(45) Date of Patent: Jul. 10, 2001

(54) METHOD AND ARRANGEMENT FOR THE INDIRECT COOLING OF THE FLOW IN RADIAL GAPS FORMED BETWEEN ROTORS AND STATORS OF TURBOMACHINES

(75) Inventors: Joachim Bremer, Zürich (CH); Michajlo Bothien, Waldshut-Tiengen (DE); Jürg Greber, Wettingen (CH); Ulf Christian Müller, Kirchdorf (CH); Dirk Wunderwald, Baden (CH); Helmut Gieszauf, Nussbaumen (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/404,467

(22) Filed: Sep. 24, 1999

(30) Foreign Application Priority Data

Feb. 10, 1998 (DE) .............................. 198 45 375

(51) Int. Cl.⁷ .................................................. F04D 29/58
(52) U.S. Cl. .......................... 417/53; 417/367; 417/406; 415/176; 415/178
(58) Field of Search ........................... 417/53, 406, 367; 415/116, 175, 176, 178–180

(56) References Cited

U.S. PATENT DOCUMENTS 2,384,251   9/1945  Hill .
3,743,170 * 7/1973  Riccio ................................. 229/144
3,827,236 * 8/1974  Rust ................................... 60/605.1
4,107,927 * 8/1978  Gordon, Jr. et al. ................ 60/605.1
4,608,827 * 9/1986  Hasegawa et al. ................. 60/605.1
4,739,619 * 4/1988  Koerkemeier ...................... 60/605.3
4,770,603 * 9/1988  Engels et al. ....................... 415/147
4,815,184 * 3/1989  Johnston et al. ................... 29/889.2
4,907,952 * 3/1990  Inoue et al. ........................ 417/407
4,927,336 * 5/1990  Rossmann et al. ................. 417/407
4,979,881 * 12/1990 Gutknecht .......................... 417/407
5,028,208 * 7/1991  Mitsubori et al. .................. 415/150
5,789,824 * 8/1998  Selfors et al. ...................... 290/52

* cited by examiner

Primary Examiner—Timothy S. Thorpe
Assistant Examiner—Ehud Gartenberg
(74) Attorney, Agent, or Firm—Burns, Doane, Swecker & Mathis, L.L.P.

(57) ABSTRACT

A method of cooling the flow in radial gaps formed between rotors and stators turbo machines is provided. The method includes the step of using water as a cooling fluid for the stator part adjacent to the radial gap. To this end, either at least one recess is formed in the interior of the stator part adjacent to the radial gap or at least one cavity is arranged at the stator part. The recess or the cavity is connected to both a feed line and a discharge line for the cooling fluid.

18 Claims, 7 Drawing Sheets

METHOD AND ARRANGEMENT FOR THE INDIRECT COOLING OF THE FLOW IN RADIAL GAPS FORMED BETWEEN ROTORS AND STATORS OF TURBOMACHINES

FIELD OF THE INVENTION

The invention relates to a method and an arrangement for the indirect cooling of the flow in radial gaps formed between rotors and stators of turbomachines.

BACKGROUND OF THE INVENTION

To seal off rotating systems, non-contact seals, in particular labyrinth seals, are widespread in turbomachine construction. In the separating gap, through which flow occurs, between rotating and stationary parts, high friction power occurs as a result of the forming flow boundary layers. This leads to heating of the fluid in the separating gap and thus also to the heating of the components surrounding the separating gap. The high material temperatures result in a reduction in the service life of the corresponding components.

DE 195 48 852 A1 discloses a radial compressor of simple construction without a sealing geometry formed in the separating gap. In this case, too, the friction heat produced as a result of flow shearing layers at the rear wall of the compressor impeller causes heating of the compressor impeller and thus reduces its service life.

EP 0 518 027 B1 discloses air cooling for radial compressors with a sealing geometry on the rear side of the compressor impeller. To this end, an additional annular space is formed between the individual sealing elements the casing wall side of the radial compressor. A cold gas which has a higher pressure than the pressure prevailing at the outlet of the compressor impeller is directed into this annular space. The air supplied acts as impingement cooling. In the process, it divides in the sealing region and flows mainly radially inward as well as outward. This is intended to additionally achieve a blocking effect against the flow of hot compressor air through the separating gap from the outlet of the compressor impeller. However, the air blown in in this way causes an increase in thrust and additional friction losses in the flow boundary layers.

In addition to this direct cooling, DE 196 52 754 A1 also discloses indirect cooling of the rear wall of the compressor impeller or of the medium flowing through the separating gap. To this end, a feed and distributing device connected to the lubricating-oil system of the turbocharger is arranged on or in the casing part disposed at the rear wall and forming with the latter the separating gap. The oil used for the bearing lubrication serves as cooling medium, for which purpose the lubricating-oil circuit of the turbocharger is tapped. A disadvantage of this cooling is the relatively high oil demand and the heat quantity to be additionally dissipated by the oil cooler. This leads to an increased overall volume of the cooler. In addition, in the event of an accident with damage to the corresponding parts, there is an increased risk of deflagration.

U.S. Pat. No. 4,815,184 also discloses water cooling of the bearing housing of a turbocharger. However, this cooling serves to remove the carbonization risk of the lubricating oil remaining in the bearing housing of the turbocharger after shutdown of the latter. In contrast to the abovedescribed solutions of the prior art, the feeding of the cooling medium is not necessary during the continuous operation but rather when the turbocharger is shut off. This type of cooling of the bearing housing is therefore unable to provide any reference to indirect cooling of the flow in radial gaps formed between rotors and stators of turbomachines. In addition, this solution expressly does not deal with the cooling of the intermediate wall.

SUMMARY OF THE INVENTION

The invention attempts to avoid all these disadvantages. Its object is to provide a method of cooling the flow in radial gaps formed between rotors and stators of turbomachines, which method is improved with regard to its cooling effect. In addition, a simple, cost-effective and robust arrangement for realizing the method is to be specified.

According to the invention, this is achieved in that, in a method according to the preamble of claim 1, water is used as cooling fluid for the stator part adjacent to the radial gap.

The water used as cooling medium has a somewhat higher density than the known lubricating oils as well as approximately twice as high a specific heat capacity. Since the heat flow to be dissipated via a cooling medium is in proportion to the product of density and specific heat capacity, a distinct advantage over oil cooling is obtained when using water. At the same mass flow and the same temperature of the water, a greater quantity of heat can thus be extracted from the medium flowing through the radial gap via the stator part to be cooled. The cooling effect on the regions of the rotor which are adjacent to the radial gap is therefore likewise greater. Conversely, to dissipate the same quantity of heat, a smaller mass flow of cooling water is required compared with the lubricating oil, as a result of which the feed and discharge device for the cooling medium may be of correspondingly smaller dimensions.

To this end, at least one recess is formed in the interior of the stator part adjacent to the radial gap or at least one cavity is arranged at the stator part. The recess or the cavity is connected to both a feed line and a discharge line for the cooling fluid. The cooling fluid is introduced or drawn off again via these lines. Depending on the rotor-side wall thickness, which is to be kept as small as possible, an improved cooling effect can be achieved by the guidance of the water directly adjacent to the radial gap in the interior of the stator part. If, however, instead of the recess in the stator part, the cavity described is formed at the stator part, simpler and more cost-effective manufacture can be realized with likewise good cooling effect.

In a system consisting of an internal combustion engine, a charge-air cooler and an exhaust-gas turbocharger, either fresh water from outside the system or advantageously water present in the system is used as cooling fluid. In the latter case, the cooling water located in a cooling-water circuit of the charge-air cooler is used for this purpose, and this cooling water is branched off upstream of the charge-air cooler. In this case, the fixed stator part is a casing part of a radial compressor, and this casing part defines the radial gap relative to the rotor, i.e. relative to the rotating compressor impeller of an exhaust-gas turbocharger.

Formed as a recess of the stator part is a tube integrally cast in the stator part, as a result of which a simple and robust cooling arrangement is obtained. As an alternative to this, at least one groove is arranged in the stator part, at least one tube which serves as recess being inserted and cast in each groove. Of course, a stator part having at least one corresponding integrally cast core, which is removed in order to form the recess, is far simpler in production.

An additional advantage is achieved by virtue of the fact that the cooling fluid, before the water cooling of the stator part adjacent to the radial gap, is used for the indirect cooling of the diffuser, receiving the main flow of the working medium downstream of the point at which the leakage flow is branched off, and of the diffuser plate delimiting the diffuser relative to the bearing housing. Effective cooling of the material of the turbomachine can thus also be achieved in this downstream region. In addition, the heat flow from the diffuser to the stator part adjacent to the radial gap is thus reduced.

In an especially advantageous manner, a second cooling fluid is used in addition to the water cooling and is directed into the radial gap, in which case air is preferably used. On account of the double cooling of the radial gap, the temperature of the rotor, which is subjected to high thermal loading, can be further reduced. To this end, at least one feed passage as well as a discharge device for the second cooling fluid are arranged at the radial gap.

By the feed of the second cooling fluid being partly or even completely shut off, the cooling effect can be adapted in a simple manner to the conditions to be expected during operation of the turbomachine or also to the actual temperature conditions.

BRIEF DESCRIPTION OF THE PREFERRED EMBODIMENT

Several exemplary embodiments of the invention are shown in the drawing with reference to an exhaustgas turbocharger connected to an internal combustion engine. In the drawing.

Only the elements essential for the understanding of the invention are shown. The direction of flow of the working media is designated by arrows.

DETAILED DESCRIPTION OF THE PREFERRED EMBODIMENT

Figure 1:
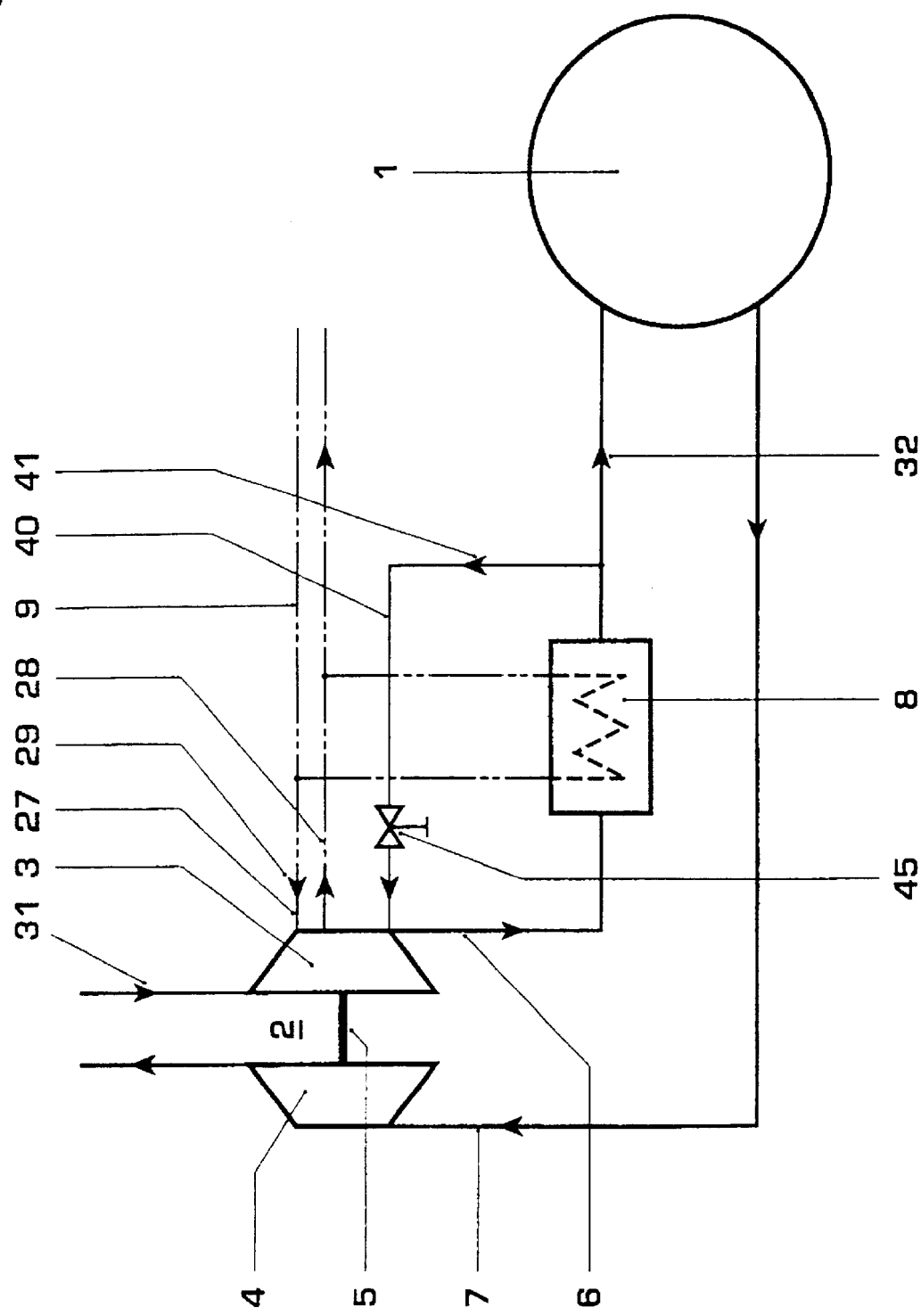
FIG. 1 shows a schematic representation of the exhaust-gas turbocharger connected to the internal combustion engine.

FIG. 1, in a schematic representation, shows an exhaust-gas turbocharger 2 interacting with an internal combustion engine 1 designed as a diesel engine. The exhaust-gas turbocharger consists of a radial compressor 3 and an exhaust-gas turbine 4, which have a common shaft 5. The radial compressor 3 is connected to the internal combustion engine 1 via a charge-air line 6, and the exhaust-gas turbine 4 is connected to the internal combustion engine 1 via an exhaust-gas line 7. A charge-air cooler 8 is arranged in the charge-air line 6, i.e. between the radial compressor 3 and the internal combustion engine 1. The charge-air cooler 8 has a cooling-water circuit 9 with a feed and discharge (not shown).

Figure 2:
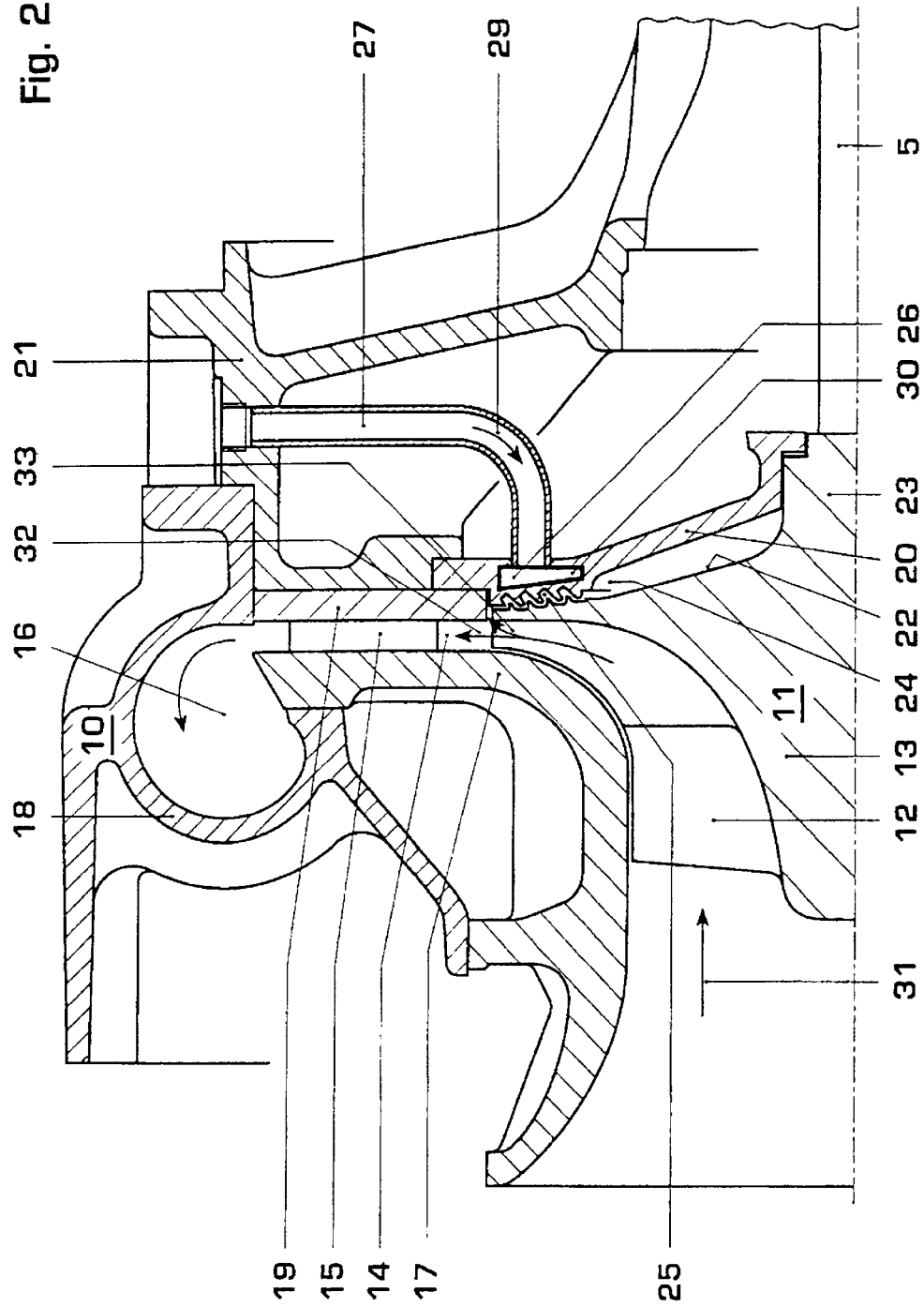
FIG. 2 shows a partial longitudinal section through the radial compressor of the exhaust-gas turbocharger.

The radial compressor 3 is equipped with a compressor casing 10, in which a rotor 11 designed as compressor impeller and connected to the shaft 5 is arranged. The compressor impeller 11 has a hub 13 fitted with a multiplicity of moving blades 12. A flow passage 14 is formed between the hub 13 and the compressor casing 10. Downstream of the moving blades 12, a radially arranged, bladed diffuser 15 adjoins the flow passage 14, the diffuser 15 in turn opening out into a spiral 16 of the radial compressor 3. The compressor casing 10 mainly comprises an air-inlet casing 17, an air-outlet casing 18, a diffuser plate 19 and a stator part 20 designed as an intermediate wall for a bearing housing 21 of the exhaust-gas turbocharger 2 (FIG. 2).

On the turbine side, the hub 13 has a rear wall 22 as well as a fastening sleeve 23 for the shaft 5. The fastening sleeve 23 is accommodated by the intermediate wall 20 of the compressor casing 10. Another suitable compressor-impeller/shaft connection may of course also be selected. Likewise, the use of an unbladed diffuser is also possible.

Figure 3:
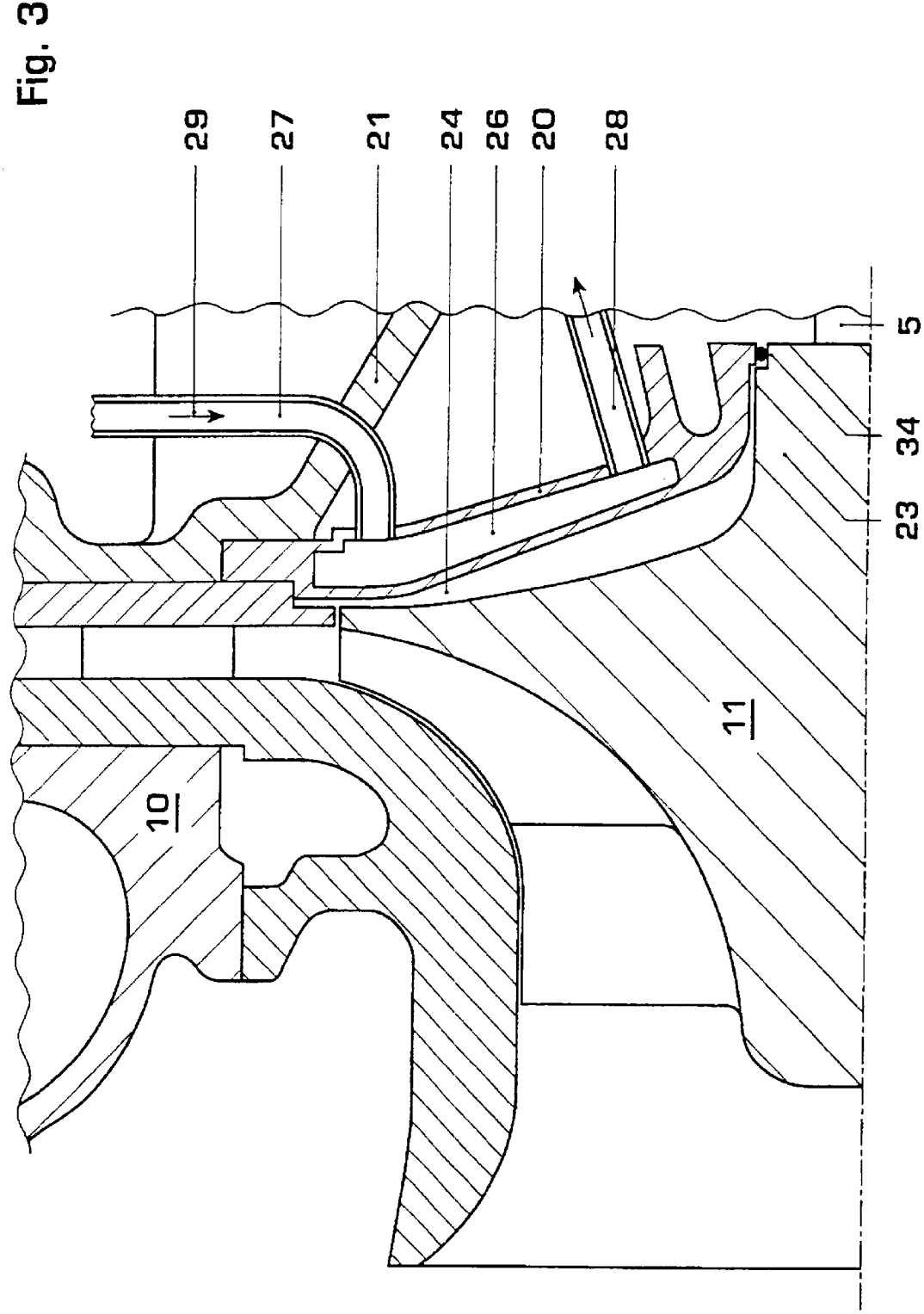
FIG. 3 shows a representation according to FIG. 2 but in a second exemplary embodiment.

There is inevitably a separating gap between the rotating compressor impeller 11, i.e. its rear wall 22, and the fixed intermediate wall 20 of the compressor casing 10, this separating gap being designed as a radial gap 24 in the case of a radial compressor 3. The radial gap 24 accommodates a labyrinth seal 25, which seals off the compressor casing 10 from the bearing housing 21. An encircling recess 26 is formed in the intermediate wall 20 of the compressor casing 10 and is connected to both a feed line 27 and a discharge line 28 for a cooling fluid 29 (FIG. 2, FIG. 3). In order to achieve as high a cooling effect as possible at the adjacent compresser impeller 11, the intermediate wall 20 is designed to be as thin as possible on the compresser-impeller side of the recess 26. To this end, a thin-walled tube 30, which is closed at both ends and the interior space of which forms the recess 26, is integrally cast during the manufacture of the intermediate wall 20 (FIG. 2).

During operation of the exhaust-gas turbocharger 2, the compressor impeller 11 draws in ambient air as working medium 31, which passes as a main flow 32 via the flow passage 14 and the diffuser 15 into the spiral 16, is compressed further there and finally, via the charge-air line 6, is used for supercharging the internal combustion engine 1 connected to the exhaustgas turbocharger 2. Beforehand, however, appropriate cooling of the working medium 31 heated up during the compression operation is effected in the charge-air cooler 8.

On its way from the flow passage 14 to the diffuser 15, the main flow 32, heated in the radial compressor 3, of the working medium 31 is also admitted as leakage flow 33 to the radial gap 24, as a result of which the compressor impeller 11 is additionally heated. However, since the operating temperature is greatest in the outer region of the compressor impeller 11, high material loading occurs there in particular. Cooling water branched off as cooling fluid 29 from the cooling-water circuit 9 of the charge-air cooler 8 is directed into the recess 26, arranged directly adjacent to this critical region, of the intermediate wall 20. Indirect cooling of the leakage flow 33 located in the radial gap 24 and thus also indirect cooling of the compressor impeller 11 therefore occur. In this case, the cooling fluid 29 is branched off upstream of the charge-air cooler 8, so that effective cooling can be achieved with the relatively cold cooling water. After the cooling action, the cooling fluid 29, which is now heated, is fed back into the cooling-water circuit 9 via the discharge line 28 downstream of the charge-air cooler 8 (FIG. 1). Of course, instead of the cooling water present in the system of internal combustion engine 1, charge-air cooler 8 and exhaust-gas turbocharger 2, fresh water may also be supplied as cooling fluid 29 from outside the system (not shown).

In a second exemplary embodiment, in which the radial gap 24 is not sealed off by means of a labyrinth seal 25 but with a sealing ring 34 arranged between the fastening sleeve 23 and the intermediate wall 20, the recess 26 is formed by a core which is integrally cast into the intermediate wall 20 and then has to be removed again (FIG. 3).

Figure 4:
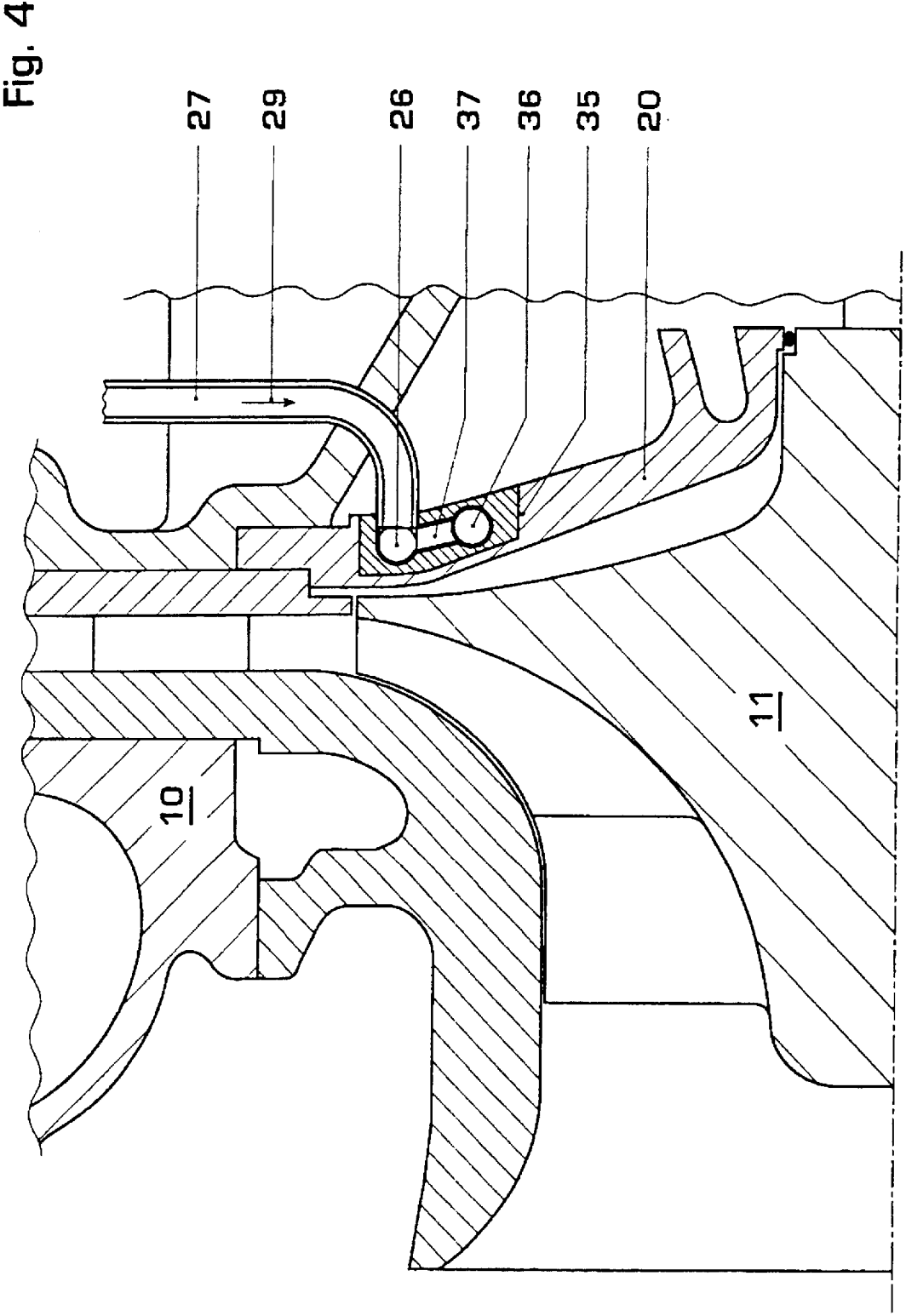
FIG. 4 shows a representation according to FIG. 2 but in a third exemplary embodiment.

In a third exemplary embodiment, a groove 35 is formed in the intermediate wall 20. Two tubes 36 are inserted and cast into the groove 35, the two tubes 36 having a connecting line 37. The interior spaces of the tubes 36 in turn form the recess 26 (FIG. 4). Of course, a single tube 36 may also be arranged in the groove 35. Likewise, two or more grooves 35, which may also accommodate more than two tubes 36, may be formed in the intermediate wall 20 (not shown).

Figure 5:
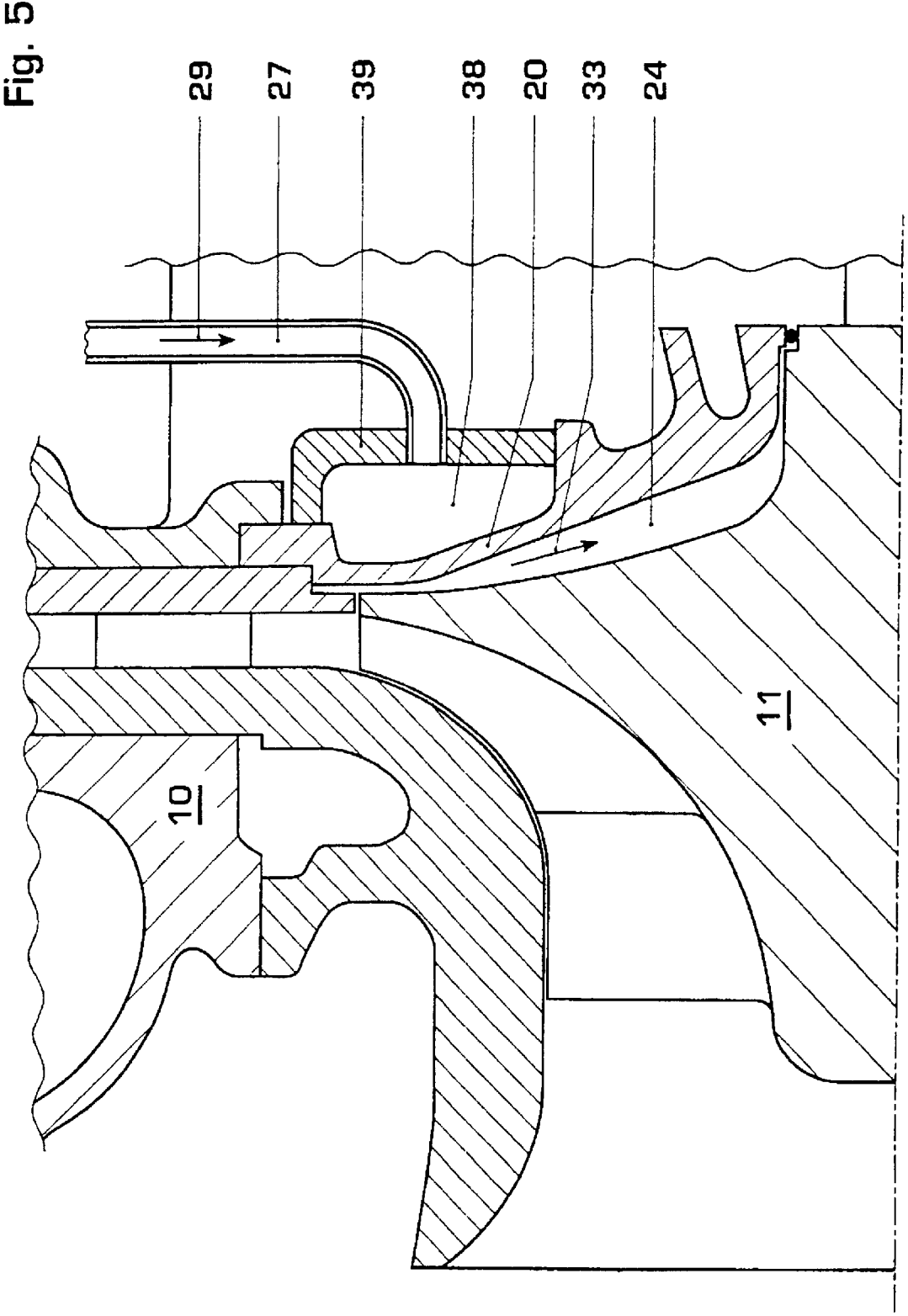
FIG. 5 shows a representation according to FIG. 2 but in a fourth exemplary embodiment.

As an alternative to the recess 26 in the intermediate wall 20, a cavity 38, in a fourth exemplary embodiment, is formed at the intermediate wall 20 and is closed off by a lid 39 on the turbine side (FIG. 5). Like the recess 26, the cavity 38 is also connected to a feed line 27 and a discharge line 28 for the cooling fluid 29. With this variant, the manufacturing outlay required to realize the cooling of the compressor impeller 11 can be advantageously reduced. The lid 39 and thus also the cavity 38 may of course also be arranged with the same function on the compressor side of the intermediate wall 20 (not shown).

In the last-mentioned exemplary embodiments, the indirect cooling of the leakage flow 33 located in the radial gap 24 and thus also the indirect cooling of the compressor impeller 11 are essentially effected in a manner similar to the action described in the first exemplary embodiment.

Figure 6:
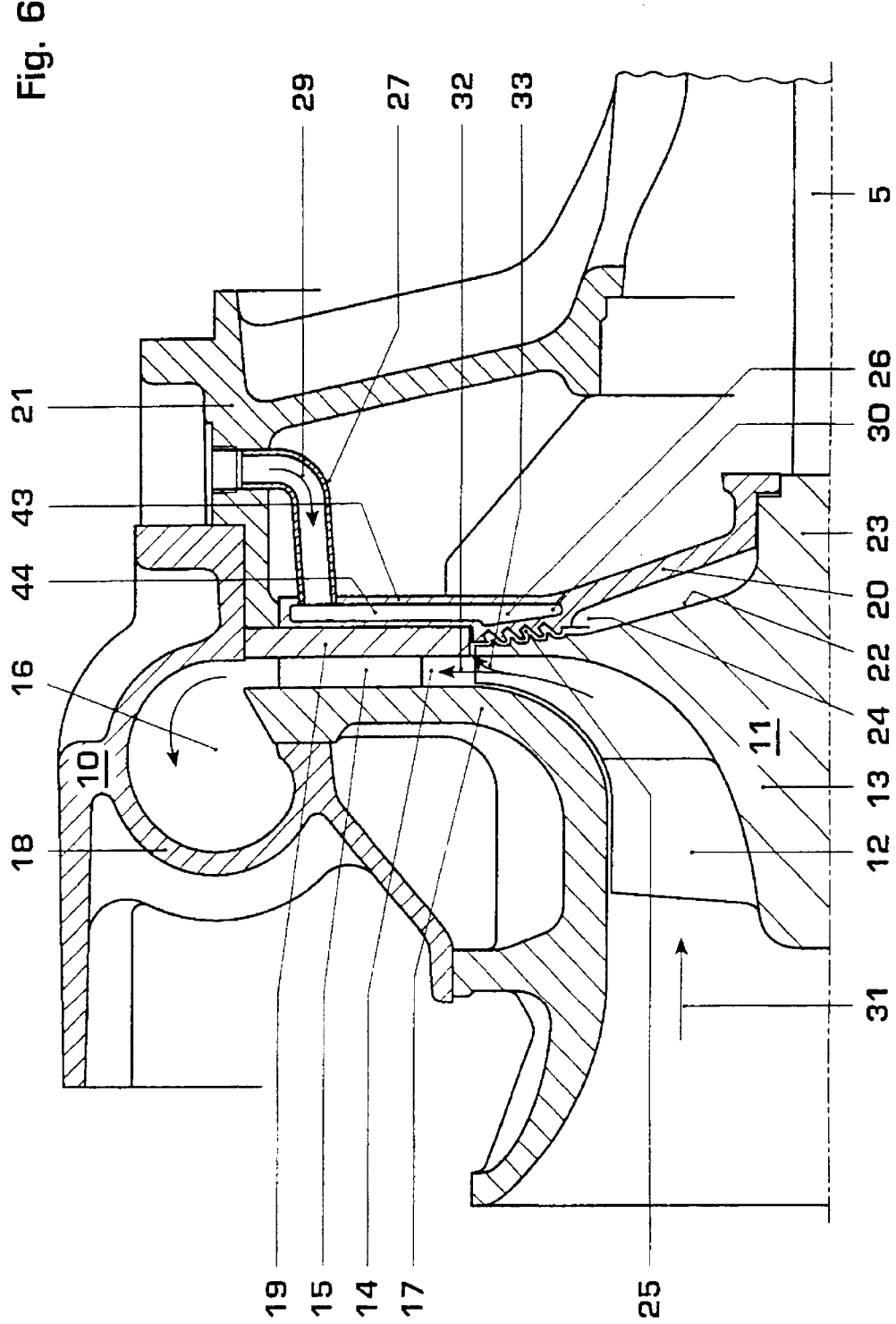
FIG. 6 shows a representation according to FIG. 2 but in a further exemplary embodiment.

In a further exemplary embodiment, the intermediate wall 20 is designed to be extended radially to the outside, so that it covers substantial regions of the diffuser 15. To this end, the intermediate wall 20 has a corresponding outer ring 43. An encircling cavity 44 is formed in the interior of the outer ring 43. The feed line 27 for the cooling fluid 29 engages on the outer ring 43 and opens out into its cavity 44, which is connected at the other end to the recess 26 of the intermediate wall 20 (FIG. 6).

In this solution, the cooling fluid 29, starting from the feed line 27, is first of all directed into the cavity 44 of the outer ring 43, where it serves for the indirect cooling of the diffuser 15 or the diffuser plate 19. Not until after that is the cooling fluid 29 directed into the recess 26 of the intermediate wall 20. There, the indirect cooling, already described above, of the leakage flow 33 is effected. The recirculation of the cooling fluid 29 into the cooling-water circuit 9 is likewise realized via the discharge line 28.

Of course, the intermediate wall 20, as in U.S. Pat. No. 4,815,184, may also merge directly into the diffuser plate 19, and the cavity 44 connected to the recess 26 of the intermediate wall 20 may be arranged in the diffuser plate 19 (not shown).

Figure 7:
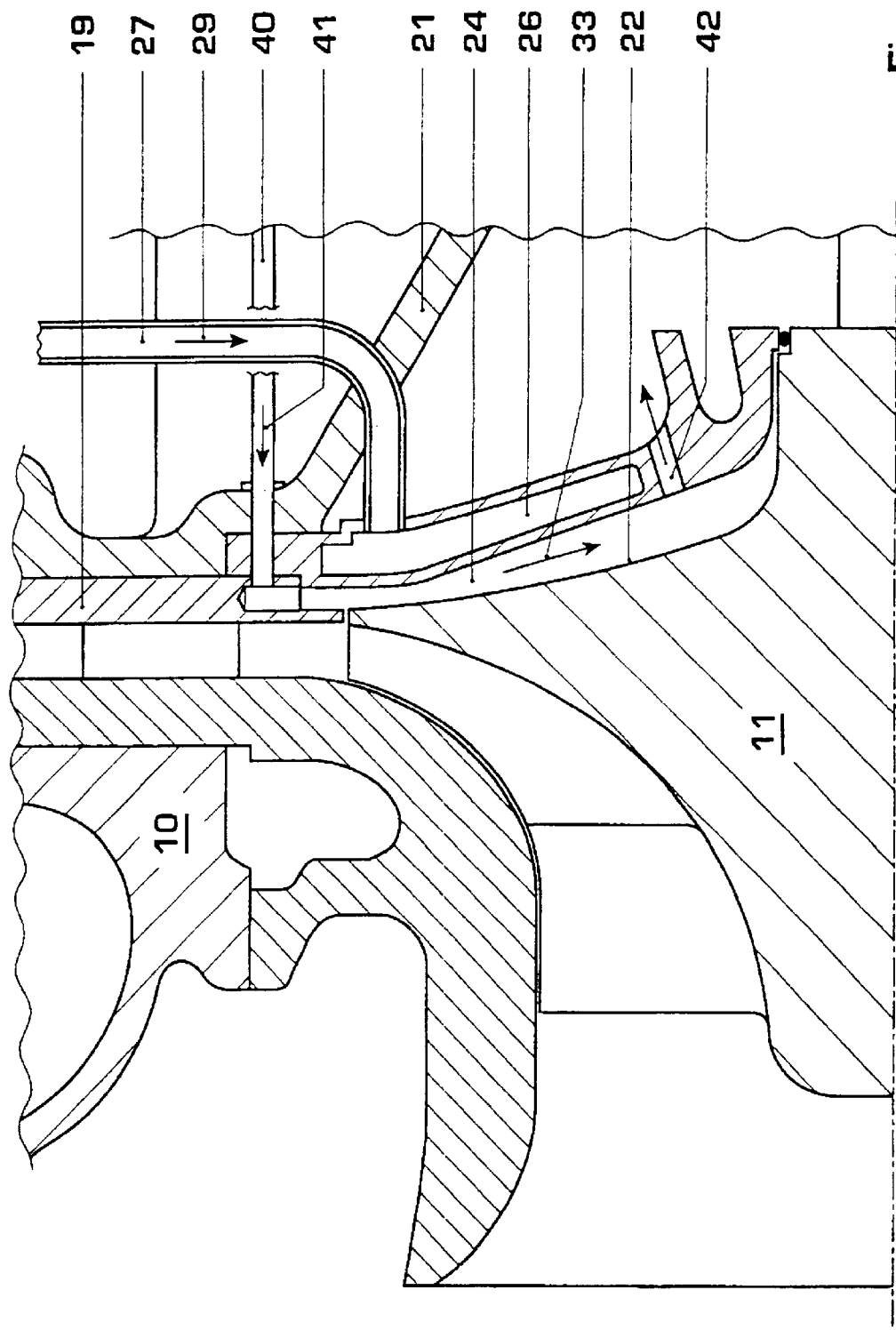
FIG. 7 shows a representation according to FIG. 2 but in a next exemplary embodiment.

In a next exemplary embodiment, in addition to the indirect cooling already described, direct cooling of the leakage flow 33 is provided. To this end, a plurality of feed passages 40 opening tangentially to the rear wall 22 of the compressor impeller 11 into the radial gap 24 and intended for a second cooling fluid 41 are arranged so as to penetrate both the bearing housing 21 and the diffuser plate 19 (FIG. 7). The feed passages 40 are connected downstream of the charge-air cooler 8 to the charge-air line 6, so that cooled charge air is used as second cooling fluid 41 (FIG. 1).

Pure film cooling of the entire rear wall 22 of the compressor impeller 11 is realized by the tangential introduction of the second cooling fluid 41. The second cooling fluid 41 replaces the hot leakage flow 33, so that the boundary layer forming on the rear wall 22 of the compressor impeller 11 is already formed from the start in particular by the cooled charge air. The subsequent drawing-off of the second cooling fluid 41 is effected via a discharge device 42 (not shown in any more detail) engaging in the intermediate wall 20 of the compressor casing 10. This combination of indirect and direct cooling results in a special cooling effect, since the two cooling possibilities complement one another in their effect and thus provide for a very significant temperature reduction in the compressor impeller 11. Of course, other cooling media may also be used as second cooling fluid 41, an external supply of compressed air also being possible (not shown).

FIG. 1 additionally shows the arrangement of a control valve 45 in the feed passage 40 for the second cooling fluid 41. The volumeric feed of the second cooling fluid 41 can be controlled by means of this control valve 45, so that adaptation of the cooling effect to the conditions to be expected or to the actual temperature conditions during operation of the exhaust-gas turbocharger 2 is made possible. In this case, the control valve 45 may be actuated by hand as well as via a measuring and control unit (not shown). Possible measuring variables are the temperature of the charge air after the charge-air cooler 8 or even the temperature of the intermediate wall 20 itself. Of course, in this way, the feed of the second cooling fluid 41 may be prevented not only partly but also completely. In the latter case, only indirect cooling, i.e. water cooling, then takes place.

The abovedescribed cooling configurations may of course be combined with one another in any desired manner, irrespective of whether a labyrinth seal 25 is arranged in the radial gap 24. During sole use of the intermediate-wall cooling, any increase in the compressor thrust and in the air leakages into the bearing housing 21 of the exhaust-gas turbocharger 2 is avoided from the outset.

What is claimed is:

1. A method for the indirect cooling of flow in radial gaps formed between rotors and stators of turbomachines, comprising the steps of:

branching off a leakage flow from a main flow of a working medium and directing the leakage flow into a radial gap;

directing the main flow into a diffuser downstream of a point at which the leakage flow is branched off;

directing a first cooling fluid to the diffuser for indirect cooling of the diffuser and diffuser plate;

admitting the first cooling fluid to a stator part adjacent the radial gap, wherein the first cooling fluid is water; and directing a second cooling fluid into the radial gap.

2. The method according to claim 1, wherein feed of the second cooling fluid is at least partly shut off.

3. The method according to claim 1, wherein the second cooling fluid is air.

4. The method according to claim 1, wherein the first cooling fluid is directed into a recess formed in the stator part.

5. The method according to claim 1, wherein the first cooling fluid is directed into a cavity disposed adjacent the stator part.

6. The method according to claim 1, wherein fresh water from outside the system including an internal combustion engine, a charge-air cooler and an exhaust-gas turbocharger is used as the first cooling fluid.

7. The method according to claim 1, wherein water present in a system including an internal combustion engine, a charge-air cooler and an exhaust-gas turbocharger is used as the first cooling fluid.

8. The method according to claim 7, wherein the cooling water present in a cooling-water circuit of the charge-air cooler is used as cooling fluid and the first cooling fluid is branched off upstream of the charge-air cooler.

9. An arrangement for carrying out the method according to claim 1, in which a fixed stator part is disposed so as to define the radial gap between the fixed stator part and the rotor, wherein at least one recess is formed in the interior of the stator part and the recess is connected to both a feed line and a discharge line for a cooling fluid.

10. The arrangement according to claim 9, wherein at least one integrally cast tube is disposed in the stator part.

11. The arrangement according to claim 9, wherein at least one groove is disposed in the stator part, and at least one tube is inserted and cast in each groove.

12. The arrangement according to claim 9, wherein the fixed stator part is designed as part of a compressor casing of a radial compressor, said fixed stator part defining the radial gap between the fixed stator part and a rotating compressor impeller of an exhaust-gas turbocharger.

13. The arrangement according to claim 9, wherein at least one feed passage and a discharge device for a second cooling fluid are disposed in the radial gap.

14. The arrangement for carrying out the method according to claim 1, in which a fixed stator part is disposed so as to define the radial gap between the fixed stator part and the rotor, wherein the at least one cavity is disposed at the stator part and the cavity is connected to both a feed line and a discharge line for a cooling fluid.

15. The arrangement according to claim 14, wherein at least one integrally cast tube is disposed in the stator part.

16. The arrangement according to claim 14, wherein at least one groove is disposed in the stator part, and at least one tube is inserted and cast in each groove.

17. The arrangement according to claim 14, wherein the fixed stator part is designed as part of a compressor casing of a radial compressor, said fixed stator part defining the radial gap between the fixed stator part and a rotating compressor impeller of an exhaust-gas turbocharger.

18. The arrangement according to claim 14, wherein at least one feed passage and a discharge device for a second cooling fluid are disposed at the radial gap.

* * * * *